United States Patent
Yang et al.

(10) Patent No.: US 12,442,649 B2
(45) Date of Patent: Oct. 14, 2025

(54) METHOD FOR GENERATING A REFERENCE TRAJECTORY WITHIN A LANE, METHOD FOR OPERATING A VEHICLE, DATA PROCESSING APPARATUS, VEHICLE, AND COMPUTER-READABLE MEDIUM

(71) Applicant: Volvo Car Corporation, Gothenburg (SE)

(72) Inventors: Derong Yang, Gothenburg (SE); Mats Jonasson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 186 days.

(21) Appl. No.: 18/158,524

(22) Filed: Jan. 24, 2023

(65) Prior Publication Data
US 2023/0236028 A1     Jul. 27, 2023

(30) Foreign Application Priority Data
Jan. 27, 2022     (EP) .................................... 22153686

(51) Int. Cl.
*G01C 21/34*     (2006.01)
*B60W 10/20*     (2006.01)
(Continued)

(52) U.S. Cl.
CPC ......... *G01C 21/3469* (2013.01); *B60W 10/20* (2013.01); *B60W 30/18145* (2013.01);
(Continued)

(58) Field of Classification Search
CPC ........... G01C 21/3469; G01C 21/3658; B60W 10/20; B60W 30/18145; B60W 40/103;
(Continued)

(56) References Cited

U.S. PATENT DOCUMENTS 8,204,669 B2 * 6/2012 Luders ................. B60K 28/165
                                                               701/87
2016/0023654 A1 * 1/2016 Yamashita ...... B60W 30/18145
                                                               701/69
(Continued)

OTHER PUBLICATIONS

Torinsson, et al., "Energy reduction by power loss minimisation through wheel torque allocation in electric vehicles: a simulation-based approach", Vehicle System Dynamics: International Journal of Vehicle Mechanics and Mobility, vol. 60, No. 5, Dec. 10, 2020 (Dec. 10, 2020), pp. 1488-1511, XP055941394, GB ISSN: 0042-3114, DOI: 10.1080/00423114.2020.1858121 * pp. 6-7 *.
(Continued)

*Primary Examiner* — Mohamad O El Sayah
(74) *Attorney, Agent, or Firm* — Amin, Turocy & Watson, LLP (57) ABSTRACT

The disclosure relates to a method for generating a reference trajectory within a lane for a vehicle. The method comprises receiving at least one vehicle current state parameter describing a current state of the vehicle (S11). The current state of the vehicle comprises at least a current position of the vehicle. Furthermore, a destination parameter describing a destination to be reached by the vehicle (S12), and at least one route parameter describing a route for reaching the destination (S13) are received. Moreover, the method comprises estimating a power loss being caused when traveling from the current position of the vehicle to the destination (S14). The reference trajectory within the lane is determined such that it minimizes the power loss and leads to the destination (S15). Additionally, a method for operating a vehicle is presented. According to this method, a reference trajectory is generated in accordance with the above method (S21) and at least one control signal is provided for controlling a motion of the vehicle along the reference trajectory
(Continued)

(S22). Furthermore, a data processing apparatus, a vehicle and a computer-readable medium are presented.

20 Claims, 2 Drawing Sheets

(51) Int. Cl.
  *B60W 30/18* (2012.01)
  *B60W 40/103* (2012.01)
  *B60W 40/105* (2012.01)
  *B60W 40/114* (2012.01)
  *G01C 21/36* (2006.01)

(52) U.S. Cl.
  CPC ........ *B60W 40/103* (2013.01); *B60W 40/105* (2013.01); *B60W 40/114* (2013.01); *G01C 21/3658* (2013.01); *B60W 2520/10* (2013.01); *B60W 2520/14* (2013.01); *B60W 2520/20* (2013.01); *B60W 2710/207* (2013.01)

(58) Field of Classification Search
  CPC ............. B60W 40/105; B60W 40/114; B60W 2520/10; B60W 2520/14; B60W 2520/20; B60W 2710/207
  See application file for complete search history.

(56) References Cited

U.S. PATENT DOCUMENTS

| | | | |
|---|---|---|---|
| 2017/0294056 A1* | 10/2017 | Bottelli | B60W 40/09 |
| 2019/0294173 A1* | 9/2019 | Szubbocsev | G05D 1/0274 |
| 2020/0122588 A1* | 4/2020 | Cserna | B60L 58/12 |
| 2020/0276974 A1* | 9/2020 | Tulpule | B60W 30/188 |
| 2020/0406969 A1* | 12/2020 | Ersal | B60W 10/20 |
| 2021/0053570 A1* | 2/2021 | Akella | G05D 1/0088 |
| 2021/0131812 A1* | 5/2021 | Gong | G01C 21/3453 |
| 2021/0373566 A1 | 12/2021 | Agarwal et al. | |
| 2023/0031030 A1* | 2/2023 | Park | B60W 30/16 |
| 2023/0087155 A1* | 3/2023 | Tuononen | B60W 40/1005 701/423 |

OTHER PUBLICATIONS

Lal, et al., "Lateral control of an autonomous vehicle based on Pure Pursuit algorithm", 2017 International Conference on Technological Advancements in Power and Energy ( Tap Energy), IEEE, Dec. 21, 2017 (Dec. 21, 2017), pp. 1-8, XP033366248, DOI: 10.1109/TAPENERGY.2017.8397361 [retrieved on Jun. 26, 2018] * p. 1 *.
Extended EP Search Report for EP Application No. 22153686.5 dated Jul. 21, 2022.
Communication pursuant to Article 94(3) EPC received for EP Patent Application Serial No. 22153686.5 dated Jun. 27, 2024, 4 pages.

* cited by examiner

METHOD FOR GENERATING A REFERENCE TRAJECTORY WITHIN A LANE, METHOD FOR OPERATING A VEHICLE, DATA PROCESSING APPARATUS, VEHICLE, AND COMPUTER-READABLE MEDIUM

TECHNICAL FIELD

The present disclosure relates to a method for generating a reference trajectory within a lane for a vehicle.

Furthermore, the disclosure is directed to a method for operating a vehicle.

Moreover, the present disclosure is directed to a data processing apparatus comprising means for carrying out the above methods, a vehicle comprising such a data processing apparatus, and a computer-readable medium.

BACKGROUND

It is known in the art to operate a vehicle such that it follows a reference trajectory within a lane. In this context, the generation of the reference trajectory may also be designated as path planning or trajectory planning. Thus, the path or trajectory defines where on a road or within a lane the vehicle is to be driven. A lane sometimes is also called a traffic lane or a track. In contrast thereto, a route for the vehicle defines which road or lane is to be taken.

A trajectory generally describes a series of positions for the vehicle, in more detail a series of longitudinal and lateral positions. The positions may by interpolated such that the trajectory is a curve.

Trajectories need to be generated for both autonomous vehicles and vehicles being driven by a human driver having advanced driver assistance systems, especially lane assistance. The latter may also be designated partially autonomous vehicles.

In known methods, the reference trajectory is generated such that it generally is located in the center of the lane. In doing so, the margins between the sides of the vehicle and the border of the lane are of substantially equal size on both sides. This ensures safe travelling of the vehicle and high comfort for the driver and the passengers.

SUMMARY

It is an object of the present disclosure to improve such methods.

The problem is at least partially solved or alleviated by the subject matter of the independent claims of the present disclosure, wherein further examples are incorporated in the dependent claims.

According to a first aspect, there is provided a method for generating a reference trajectory within a lane for a vehicle, comprising:
- receiving at least one vehicle current state parameter describing a current state of the vehicle, wherein the current state of the vehicle comprises at least a current position of the vehicle,
- receiving a destination parameter describing a destination to be reached by the vehicle,
- receiving at least one route parameter describing a route starting at the current position of the vehicle (V) and ending at the destination,
- estimating a power loss being caused when traveling from the current position of the vehicle to the destination, the power loss being a function of at least one vehicle state parameter describing a state of the vehicle along the route, the destination parameter and a traveling time, and
- determining the reference trajectory within the lane that minimizes the power loss and leads to the destination.

The current state parameter and/or the destination parameter and/or the route parameter may be received from a navigation unit. The navigation unit may be configured for calculating a route leading the vehicle from a current position to a destination. By estimating a power loss and by determining the reference trajectory which minimizes the power loss, the energy efficiency of the vehicle is increased when the vehicle travels along the reference trajectory. Consequently, the driving range of the vehicle is increased. This is the case for both electric vehicles and vehicles being powered by an internal combustion engine. Moreover, the direct or indirect emissions per distance unit of the vehicle are reduced.

In the present disclosure, a power loss represents power that was intended to fulfill a vehicle motion request but has not been used thereto and is thus lost.

The general idea underlying the present disclosure is to consider the energy efficiency when generating a reference trajectory.

In an example, the vehicle current state parameter and the vehicle state parameter each comprise at least one of a corresponding longitudinal position of the vehicle, a corresponding lateral positon of the vehicle, a corresponding yaw angle of the vehicle, a corresponding longitudinal speed of the vehicle, a corresponding side-slip angle of the vehicle and a corresponding yaw rate of the vehicle. Thus, the vehicle current state parameter and the vehicle state parameter may relate to the same properties, however the corresponding values may be different. Sometimes, the longitudinal position of the vehicle is designated as a position along a X axis and the lateral positon is designated as a position along a Y axis. In this context, a yaw angle is measured around a Z axis. The X, Y and Z axes are perpendicular to one another. The side slip angle is the angle between the vehicle longitudinal direction and the traveling direction of the vehicle's center of gravity. Consequently, the vehicle current state can be described with high precision. This also applies to a vehicle state in general and the vehicle state as it evolves along the route.

According to an example, the reference trajectory is described by at least one of a reference longitudinal position, a reference lateral position, a reference yaw angle, a reference longitudinal speed or time. In this context, time may be travelling time. Thus, the reference trajectory is described in a simple and computationally efficient manner. It is understood that the reference longitudinal position, the reference lateral position, the reference yaw angle, and the reference longitudinal speed are provided as functions over time.

In an example, the power loss comprises at least one of a propulsion loss, a transmission loss, a tire loss and a drag loss. Thus, the power loss can be calculated with high precision. In this context, the propulsion loss may comprise losses occurring in the electric motor used for propelling the vehicle and the corresponding inverter unit. Of course, also a plurality of electric motors and/or a plurality of inverter units may be used. The transmission loss comprises losses occurring in a transmission. The tire loss may comprise losses occurring at the interface of the tires and the road.

In an example, the propulsion loss may be determined on a test bench where the at least one electric motor and the at least one inverter unit are operated in one or more operational points. The operational points are for example characterized by a torque which is provided by the electric motor. If the at least one electric motor and the at least one inverter unit are operated in more than one operational points, a curve describing the propulsion loss as a function of the provided torque can be generated using a curve fit technique. In an example, the curve fit uses a quadratic function.

In an example, the transmission loss may be determined on a test bench where the transmission is operated in one or more operational points. The operational points are for example characterized by a torque which is provided at an output of the transmission. If the transmission is operated in more than one operational points, a curve describing the transmission loss as a function of the provided torque can be generated using a curve fit technique. In an example, the curve fit uses a quadratic function.

In an example, the tire loss may comprise at least one of a longitudinal slip loss, a lateral slip loss and a rolling resistance power loss. The longitudinal slip loss and the lateral slip loss may be calculated by multiplying a corresponding longitudinal or lateral force with the corresponding slip velocity.

In an example, the drag loss may be calculated as a function of a drag coefficient, the density of air and the speed of the vehicle.

In an example, estimating the power loss comprises using a predefined power loss function. In the context of an optimization problem, the predefined power loss function is a so-called "cost function". Once the types of power losses to be considered are determined, the formulae describing these losses may be combined into the predefined power loss function. This is computationally efficient. Thus, the power loss may be derived in a reliable manner.

In an example, the method may comprise integrating the power loss over time in order to calculate an energy loss. Thus, an energy loss may be easily calculated. When integrating the power losses over the traveling time, an energy loss of a drive cycle may be determined and minimized in accordance with the present method.

In an example, determining the reference trajectory may comprise respecting at least one of a drivable area, a desired speed, a minimum lateral margin, a maximum allowable side slip angle, a maximum available torque, and a road friction coefficient as a boundary condition. An alternative term for boundary condition is constraint. The drivable area designates the area of the lane on which the vehicle may drive. The drivable area may be defined within the same plane as a longitudinal and lateral position of the vehicle. The desired speed describes the driving behavior or the human or autonomous driver. The lateral margins need to be respected in order to avoid collisions with vehicles or objects on neighboring lanes. The maximum allowable side slip angle guarantees that the vehicle stays stable and controllable. The maximum available torque is a characteristic of a propulsion system of the vehicle. By respecting at least one of the above boundary conditions, a realistic and safe reference trajectory is determined.

In an example, at least one of the drivable area, the desired speed, the minimum lateral margin, the maximum allowable side slip angle, the maximum available torque, and the road friction coefficient is known or received. The drivable area may be received from the navigation unit. Alternatively or additionally, the drivable area may be received from a camera unit being configured for detecting a drivable area of a lane ahead of the vehicle. The desired speed may be derived from a speed limit being for example provided by the navigation unit. Alternatively or additionally, the desired speed may be derived from historic drive data. In a very simple case the desired speed is the historic average speed. The minimum lateral margin may be provided as a function of speed. The road friction coefficient may be received from a table or map of road coefficients. The road friction coefficient may also be derived from a classification of the corresponding road, e.g. highway or city road. The classification of the relevant road may be provided by the navigation unit. In a very simple case a standard parameter may be used as the road friction coefficient. Thus, the parameters being used as boundary conditions can be provided in a simple and reliable manner.

In an example, the method comprises receiving the at least one vehicle current state parameter from a sensor unit. This is a simple and reliable way to use up-to-date input parameters when performing the method.

According to a second aspect, there is provided a method for operating a vehicle, comprising:
  generating a reference trajectory according to the present disclosure,
  providing at least one control signal for controlling a motion of the vehicle along the reference trajectory.

Thus, the vehicle may be operated to follow the reference trajectory. Consequently, the power loss occurring while traveling along the reference trajectory is minimized. In other words, the energy efficiency of the vehicle is increased. This leads to an increased driving range of the vehicle. Also corresponding emissions per distance unit of the vehicle may be reduced.

In an example, the method for operating a vehicle is implemented as a closed loop control method. In this context, one or more sensors may be used to determine a potential deviation of the vehicle from the reference trajectory. The sensors may comprise at least one of an inertial measurement unit for determining a yaw rate, a vehicle speed sensor for determining a vehicle speed and a positioning sensor, e.g. a GPS sensor, for determining a position of the vehicle. The control may be performed in real time.

In an example, the control signal may comprise a steering angle control signal. Using such a signal, the vehicle can be operated such that it follows the reference trajectory without or with a minimal deviation only.

In an example, the method comprises performing a pure pursuit control technique for controlling steering angle. Thus, the desired steering angle can be set with high reliability.

The method for generating a reference trajectory within a lane for a vehicle and/or the method for operating a vehicle may be at least partly computer-implemented, and may be implemented in software or in hardware, or in software and hardware.

According to a third aspect there is provided a data processing apparatus comprising means for carrying out the method according to the disclosure. The data processing means may be a suitable computing means, such as an electronic control module etc., which may also be a distributed computer system. The data processing means or the computer, respectively, may comprise one or more of a processor, a memory, a data interface, or the like.

According to a fourth aspect there is provided a vehicle comprising a data processing apparatus according to the third aspect of the present disclosure.

According to a fifth aspect, there is provided a computer-readable medium comprising instructions which, when executed by a data processing unit, cause the data processing unit to carry out the method of the present disclosure.

In an example, the data processing unit may be a computer.

It should be noted that the above examples may be combined with each other irrespective of the aspect involved.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

FIG. 2 illustrates a pure pursuit control technique for controlling a steering angle, FIG. 3 schematically shows two exemplary reference trajectories which have been generated by the method for generating a reference trajectory within a lane for a vehicle of FIG. 1, and FIG. 4 schematically shows a data processing apparatus according to the present disclosure comprising means for carrying out the methods of FIG. 1.

The figures are merely schematic representations and serve only to illustrate examples of the disclosure. Identical or equivalent elements are in principle provided with the same reference signs.

DETAILED DESCRIPTION

Figure 1:
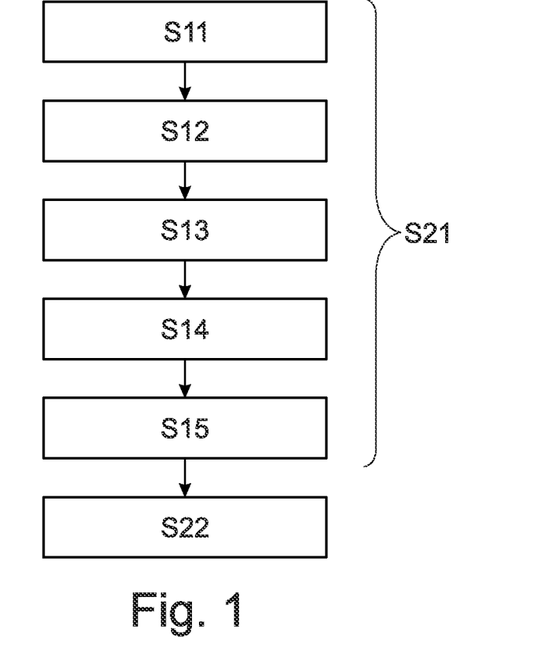
FIG. 1 shows steps of a method according to the present disclosure for generating a reference trajectory within a lane for a vehicle and of a method according to the present disclosure for operating a vehicle.
Figure 3:
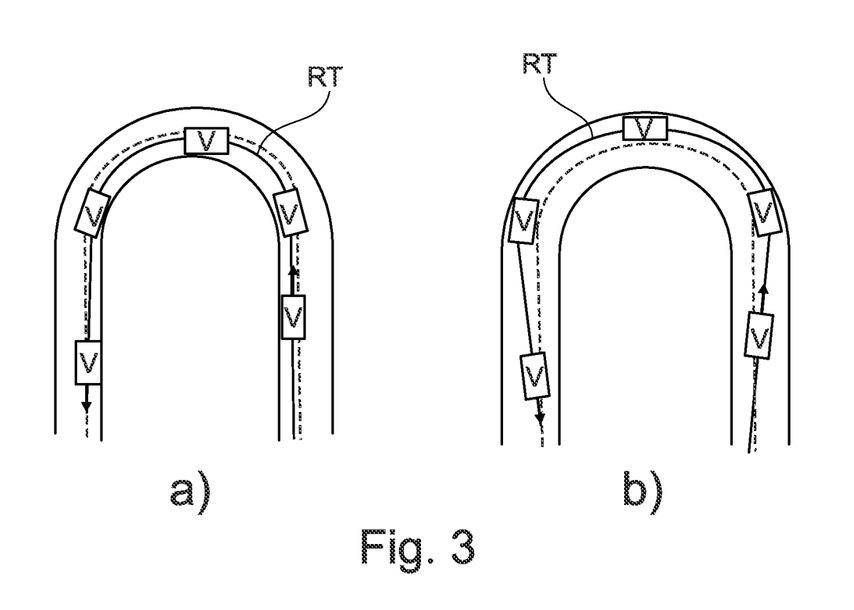

FIG. 1 shows a method for generating a reference trajectory RT within a lane for a vehicle V comprising steps S11 to S15 and a method for operating a vehicle comprising steps S21 and S22 (see also FIG. 3).

Step S11 of the method for generating a reference trajectory RT within a lane for a vehicle V comprises receiving at least one vehicle current state parameter describing a current state of the vehicle.

In the example as shown in the figures, the current state of the vehicle V is described by a position of the vehicle. Thus, in step S11, a longitudinal position of the vehicle, a lateral positon of the vehicle, and a yaw angle of the vehicle are received. These vehicle current state parameters may be expressed in a vehicle coordinate system, i.e. a coordinate system having its origin on the vehicle. Alternatively, a global coordinate system may be used.

Additionally, the current state of the vehicle may be described by a longitudinal speed of the vehicle, a side-slip angle of the vehicle or a yaw rate of the vehicle. Also these vehicle current state parameters may be expressed in a vehicle coordinate system or a global coordinate system.

The parameters describing the vehicle current state may be received from a navigation unit using GPS data. More generally, the vehicle current state parameters are received from as sensor unit.

Step S12 comprises receiving a destination parameter. The destination parameter describes a destination to be reached by the vehicle. The destination parameter may describe a position. Also the destination parameter may be received from a navigation unit using for example GPS data.

A further step S13 comprises receiving at least one route parameter. The route parameter describes a route starting at the current position of the vehicle V and ending at the destination, i.e. a route leading from the current position of the vehicle to the destination. As has been described before, a route defines which road or lane is to be taken.

It is obvious that the vehicle current state and the destination parameter need to be known in order to be able to calculate the at least one route parameter. However, of course different routes may be available for connecting a vehicle having a current state and a destination.

Thereafter, a step S14 comprises estimating a power loss $P_{loss}$ being caused when traveling from the current position of the vehicle V to the destination along the route.

The power loss $P_{loss}$ is a function of at least one vehicle state parameter describing a state of the vehicle along the route, the destination parameter and a traveling time.

The estimated power loss $P_{loss}$ comprises a propulsion loss, a transmission loss, a tire loss and a drag loss.

In the present example, the propulsion loss $P_{P,loss}$ describes a loss occurring in a propulsion system of the vehicle V, e.g. in an electric motor and a corresponding inverter unit. The propulsion loss $P_{P,loss}$ is estimated as a function of the delivered propulsion torque T. It is assumed that the propulsion loss $P_{P,loss}$ may be described by a quadratic function over the torque T which reads as follows:

$$P_{P,loss} = a_1 T^2 + a_2 T + a_3$$

The parameters $a_1$, $a_2$, $a_3$ depend from a rotational speed of the propulsion motor which may be an electric motor.

The propulsion loss $P_{P,loss}$ is assessed on a test bench using several operational points of the propulsion system. The parameters $a_1$, $a_2$, $a_3$ of the above formula are determined by performing a curve fit.

The transmission loss $P_{T,loss}$ comprises a loss occurring in a transmission. The transmission loss $P_{T,loss}$ is also described by a quadratic function over torque T. As before, the transmission loss $P_{T,loss}$ is assessed on a test bench by operating the transmission in a number of operational points. Subsequently, a quadratic curve fit is performed. Consequently, the transmission loss $P_{T,loss}$ can be described by the following formula:

$$P_{T,loss} = b_1 T^2 b_2 T + b_3$$

The parameters $b_1$, $b_2$, $b_3$ depend from a rotational speed of the transmission and are determined when performing the curve fit.

In the present example, one component of the tire loss $P_{Ti,loss}$ is assumed to be a longitudinal slip loss $P_{Sx,loss}$. The longitudinal slip loss $P_{Sx,loss}$ is calculated using the following formula, wherein the longitudinal slip loss of each of the four wheels i=1 to i=4 of the vehicle are cumulated:

$$P_{Sx,loss} = \sum_{i=1}^{4} F_{xi}(r_{ei}\omega_i - v_{xwi})$$

In this formula, $F_{xi}$ is the longitudinal force acting on wheel i in the x direction.

The longitudinal velocity of the center of the wheel i, i.e. the velocity of the center of the wheel i along the x direction is denoted $v_{xwi}$. The parameter $r_{ei}$ is the effective radius of the wheel i and $\omega_i$ is the rotational velocity of the wheel i.

If a linear tire model is used and the resulting expression is linearized, the above formula can be rewritten as follows:

$$P_{Sx,loss} = \sum_{i=1}^{4} \left( \frac{v_{xi} n_i^2}{C_{xj} r_{ei}^2} T_{mi}^2 \right)$$

In this formula $C_{xj}$ is the longitudinal tire stiffness of the tires of axle j. The parameter $n_i$ is the rotational speed of the respective wheel i of the axle and $T_{mi}$ is the torque transmitted by the wheel i. The parameter $v_{xi}$ is the longitudinal velocity of the wheel i. The parameter $r_{ei}$ again relates to the effective radius of the wheel i.

Another component of the tire loss $P_{Ti,loss}$ is assumed to be a lateral slip loss $P_{Sy,loss}$. The lateral slip loss $P_{Sy,loss}$ can be calculated as follows:

$$P_{Sy,loss} = \Sigma_{i=1}^{4} F_{yi}(v_{yi} - v_{xi}\delta_i)$$

In this expression $F_{yi}$ is the lateral force acting on wheel i. The parameter $v_{yi}$ is the lateral velocity of the wheel i and $v_{xi}$ is the longitudinal velocity of the wheel i. $\delta_i$ is the steering angle of wheel i.

If again a linear tire model is used and the resulting expression is linearized, the above formula can be rewritten as follows:

$$P_{Sy,loss} = \Sigma_{i=1}^{4} C_{yi} \alpha_i^2 v_x$$

In this expression, $C_{yi}$ is the lateral tire stiffness of the wheel i and $\alpha_i$ is the tire slip angle of the wheel i. $v_x$ is the longitudinal velocity of the vehicle.

An additional component of the tire loss is the rolling resistance power loss $P_{RR,loss}$ which may be calculated as follows:

$$p_{RR,loss} = \sum_{i=1}^{4} \omega_i F_{zi} r_0 \left( q_1 + q_2 \frac{F_{xi}}{F_{z0}} + q_3 \left| \frac{v_{xi}}{v_{ref}} \right| + q_4 \left( \frac{v_{xi}}{v_{ref}} \right)^4 \right)$$

In the above formula, the parameters $r_0$, $q_1$, $q_2$, $q_3$, $q_4$, $v_{ref}$ and $F_{z0}$ are obtained through tire measurements. $F_{zi}$ is a force acting on the wheel i in the z direction. As before, $v_{xi}$ is the longitudinal velocity of the wheel i, $F_{xi}$ is the longitudinal force acting on wheel i in the x direction, and $\omega_i$ is the rotational velocity of the wheel i.

Thus, the tire loss $P_{Ti,loss}$ is the sum of the longitudinal slip loss $P_{Sx,loss}$, the lateral slip loss $P_{Sy,loss}$, and the rolling resistance power loss $P_{RR,loss}$.

As has been mentioned above, the drag loss $P_{D,loss}$ may be calculated as a function of a drag coefficient, the density of air and the speed of the vehicle.

The different types of losses may be summed up in a power loss function. Thus, estimating the power loss $P_{loss}$ comprises using a predefined power loss function.

In case the energy losses are of interest, the power loss $P_{loss}$ may be integrated over time. The result is an energy loss occurring during the integration time. The integration time may be the travelling time.

Once, the power loss function is known, in step S15 a reference trajectory RT may be determined which minimizes the power loss function.

The reference trajectory RT may be described by a reference longitudinal position along direction x, a reference lateral position along a direction y, and a reference yaw angle $\psi$. In the present example, the reference longitudinal position, the reference lateral position, and the reference yaw angle are functions over traveling time.

Additionally, the reference trajectory RT may be described by a reference longitudinal speed.

It is understood that the above minimization problem is subject to several boundary conditions.

First of all, the reference trajectory RT must lead to the destination.

Furthermore, the reference trajectory RT must not exit the drivable lanes of the route. In other words, a drivable area needs to be respected. The vehicle V must stay within the drivable area at all time.

In order to allow safe travelling of the vehicle V, also minimum lateral margins with respect to a border of the drivable area must be respected.

A further boundary condition may relate to a maximum allowable side slip angle. This parameter may be chosen such that the vehicle stays stable and controllable at any time.

Moreover, a maximum available torque may be respected which is a characteristic of the propulsion unit and especially a propulsion motor of the vehicle V.

An additional boundary condition may relate to a road friction coefficient.

Furthermore, a desired speed may be respected as a boundary condition. The desired speed may be described by an allowable maximum speed and an allowable minimum average speed.

It is noted that the desired speed is used for calculating the reference trajectory only. The actual speed when driving along the reference trajectory may differ therefrom.

In the example shown in the figures, the above-mentioned boundary conditions are known, i.e. provided by a storage unit of the vehicle.

The reference trajectory may be used in a method for operating a vehicle comprising steps S21 and S22.

Step S21 relates to the generation of the reference trajectory RT and comprises steps S11 to S15.

Step S22 comprises providing at least one control signal for controlling a motion of the vehicle along the reference trajectory.

In the present example, the control signal comprises a steering angle control signal. This means that the steering angle $\delta$ of the vehicle is controlled such that the vehicle follows the reference trajectory RT.

To this end, a pure pursuit control technique may be performed for controlling the steering angle $\delta$.

This control technique is explained in connection with FIG. 2, where a vehicle V having a length L is shown.

Figure 2:
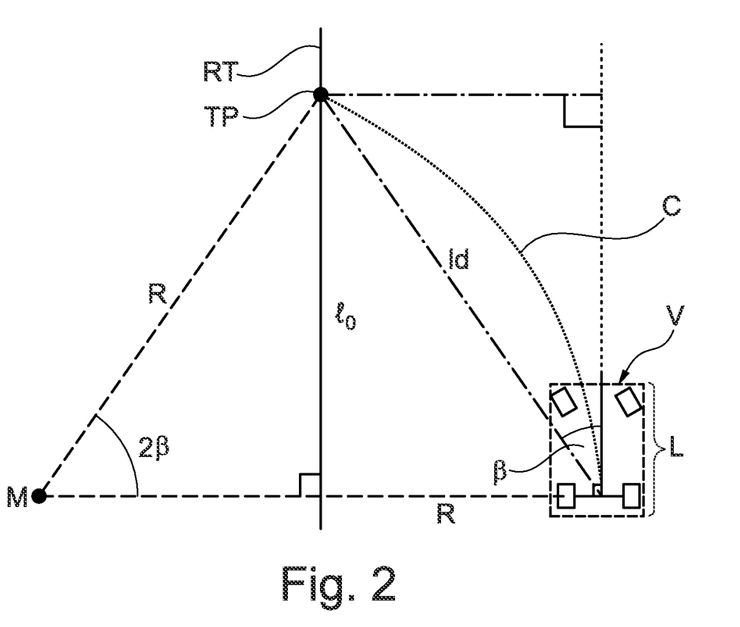

The vehicle V intends to follow the reference trajectory RT which is represented as a straight line in FIG. 2 for the ease of explanation. It is understood that the reference trajectory RT could as well be curved which is closer to reality than a straight reference trajectory.

The pure pursuit control technique is a geometric path tracking control technique which uses only the geometry of the vehicle kinematics and the reference trajectory. The pure pursuit control technique ignores dynamic forces and assumes a no-slip condition of the vehicle.

In this context, a target point TP on the reference trajectory RT is used. The target point TP is ahead of the vehicle V at a fixed and known distance $l_d$ from the vehicle. The distance $l_d$ may be called a look ahead distance.

An angle between the direction of $l_d$ and the direction of the length L of the vehicle V is designated $\beta$. Also $\beta$ is known and may be called a look ahead angle.

The objective is to steer the vehicle to the target point TP. To this end, the vehicle V would need to travel along curve C which has a radius R and a center point M.

In this context, a center of the rear axle of the vehicle is used as reference point on the vehicle. This point, the center point M and the target point TP form a triangle.

The portion of the reference trajectory being located within this triangle has a length $l_0$ which can be expressed as follows:

$$l_0 = \sin(2\beta)R$$

$$l_0 = \sin\left(\frac{\pi}{2} - \beta\right)l_d$$

This results in the following equation $$\frac{R}{\sin\left(\frac{\pi}{2} - \beta\right)} = \frac{l_d}{\sin(2\beta)}$$

This equation can be rewritten as $$2R = \frac{l_d}{\sin(\beta)}$$

The so-called bicycle model provides the following dependency of the radius R, the length of the vehicle L and the steering angle δ:

$$R = \frac{L}{\tan(\delta)}$$

Thus, the steering angle δ can be expressed as $$\delta = \arctan\left(2L\frac{\sin(\beta)}{l_d}\right)$$

It is noted that the look ahead distance $l_d$ can be varied based on the vehicle speed.

FIG. 3 schematically shows two exemplary reference trajectories RT (cf. FIG. 3 a) and FIG. 3 b)) which have been generated by the method for generating a reference trajectory RT within a lane for a vehicle V as described above. Using the pure pursuit control technique, the vehicle V is able to reliably follow these reference trajectories RT.

In order to illustrate the difference over known reference trajectories, both FIG. 3 a) and FIG. 3 b) also show a dotted line representing the middle of the respective lane, i.e. a trajectory always having an identical lateral distance from the border of the lane on both sides.

In the example of FIG. 3 a), the minimization of the power loss $P_{loss}$ results in the minimization of the travel distance. Thus, in this example, the reference trajectory RT has a minimum length which of course respects boundary conditions such as the drivable area and the minimum lateral margins.

In the example of FIG. 3 b) the lateral tire slip loss is comparatively high. The corresponding kind of loss is reduced by increasing the curve radius of the reference trajectory RT. Thus, in this example, the reference trajectory RT minimizing the power loss maximizes the curve radius. This leads to the fact that the reference trajectory RT being calculated by the method as described above is longer than a reference trajectory following the middle of the lane (cf. dotted line).

Figure 4:
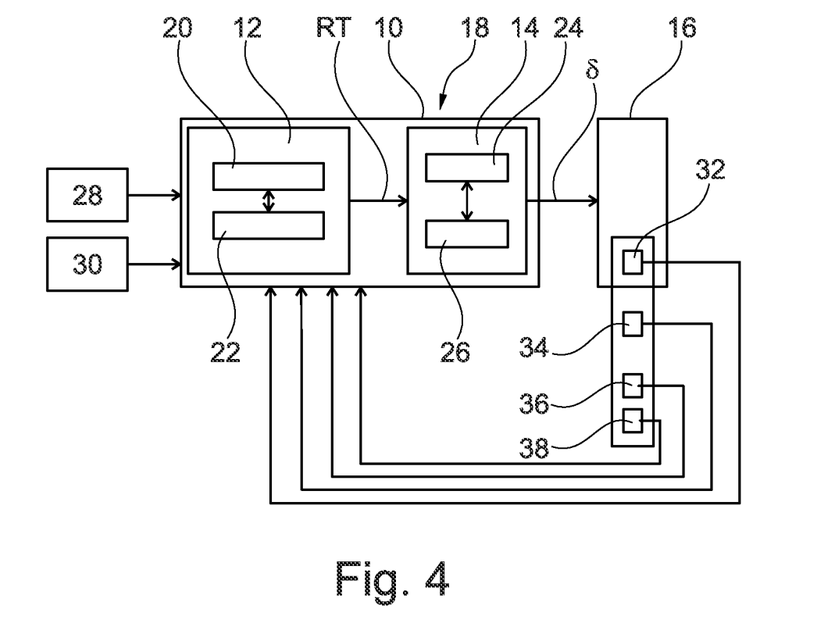

FIG. 4 shows a data processing apparatus 10 comprising first means 12 for carrying out the method for generating a reference trajectory RT within a lane for a vehicle V.

Moreover, the data processing apparatus 10 comprises second means 14 for providing a control signal for controlling a motion of the vehicle V along the reference trajectory RT. In the present example, the control signal relates to a steering angle δ of a steering system 16 of the vehicle V.

The first means 12 and the second means 14 together form a third means 18 for carrying out the method for operating the vehicle V.

In more detail, the first means 12 comprises a data processing unit 20, e.g. a computer, on which a computer program product may be executed.

The computer program product comprises instructions which, when the program is executed by the data processing unit 20, cause the data processing unit 20 to carry out the method for generating a reference trajectory RT within a lane for a vehicle V.

The first means 12 additionally comprise a computer-readable medium 22 which may also be designated a storage unit. The computer-readable medium 22 comprises instructions which, when executed by the data processing unit 20, cause the data processing unit 20 to carry out the method for generating a reference trajectory RT within a lane for a vehicle V.

The data processing unit 20 and the computer-readable medium 22 interact with each other in order to generate the reference trajectory RT, i.e. in order to perform the method for generating a reference trajectory RT within a lane for a vehicle V.

As an output, the first means 12 provides a reference longitudinal position, a reference lateral position, a reference yaw angle, and a reference longitudinal speed over time which describe the reference trajectory RT.

The second means 14 receives these parameters describing the reference trajectory RT as an input.

In more detail, the second means 14 comprises a data processing unit 24, e.g. a computer, on which a computer program product may be executed.

The computer program product comprises instructions which, when the program is executed by the data processing unit 24, cause the data processing unit 24 to provide a control signal for controlling a motion of the vehicle V along the reference trajectory RT which is a control signal relating to the steering angle δ in the present disclosure.

The second means 14 additionally comprise a computer-readable medium 26 which may also be designated a storage unit. The computer-readable medium 26 comprises instructions which, when executed by the data processing unit 24, cause the data processing unit 24 to provide the control signal.

The data processing unit 24 and the computer-readable medium 26 interact with each other in order to provide the control signal.

The second means 14 thus provides the steering angle δ as an output which is received by the steering system 16 of the vehicle V.

The steering system 16 comprises a steering angle sensing unit 32 which is configured for detecting a current steering angle δ.

The current steering angle δ is fed back to the data processing apparatus 10, more precisely to the second means 14 such that the steering angle δ can be controlled in a closed loop manner.

Moreover, the vehicle V comprises a position sensor 34, e.g. using a GPS signal. The sensing results of the position sensor 34 are provided to the data processing apparatus 10, especially to the first means 12. The position sensor 34 may provide a longitudinal position, a lateral position and a yaw angle of the vehicle V.

Additionally, the vehicle V comprises an inertial measurement unit 36 which is able to detect a yaw rate of the vehicle and provide the yaw rate to the data processing apparatus 10, especially to the first means 12.

The vehicle also comprises a speed sensing unit 38 which is able to detect or estimate a longitudinal speed of the vehicle V. The speed sensing unit 38 is configured for providing the detection result to the data processing apparatus 10, especially to the first means 12.

The steering angle sensing unit 32, the position sensor 34, the inertial measurement unit 36 and the speed sensing unit 38 may be summarized as a sensor unit 40.

The sensor unit 40 thus is configured for providing vehicle current state parameters describing a current state of the vehicle V to the data processing apparatus 10 and in particular the first means 12.

The destination parameter and the route parameter may be received from a navigation unit 28

Also boundary conditions as described above and generally designated with reference sign 30 may be received. Alternatively, the boundary conditions may be stored on the computer-readable media 22, 26.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 10 data processing apparatus
12 first means
14 second means
16 steering system
18 third means
20 data processing unit
22 computer-readable medium
24 data processing unit
26 computer-readable medium
28 navigation unit
30 boundary condition
32 steering angle sensing unit
34 position sensor
36 inertial measurement unit
38 speed sensing unit
40 sensor unit
$a_1$ parameter
$a_2$ parameter
$a_3$ parameter
$b_1$ parameter
$b_2$ parameter
$b_3$ parameter
C curve
$C_{xj}$ longitudinal tire stiffness of the tires of axle j
$C_{yi}$ lateral tire stiffness of the wheel i
$F_{xi}$ longitudinal force on wheel i
$F_{yi}$ lateral force on wheel i
$F_{zi}$ force acting on the wheel i in the z direction
$F_{z0}$ parameter obtained through tire measurement
i wheel index
j axle index
$l_0$ length
$l_d$ look ahead distance
M center point
$n_i$ rotational speed of the wheel i
$P_{loss}$ power loss
$P_{D,loss}$ drag loss
$P_{P,loss}$ propulsion loss
$P_{Ti,loss}$ tire loss
$P_{Sx,loss}$ longitudinal slip loss
$P_{Sy,loss}$ lateral slip loss
$P_{T,loss}$ transmission loss
$P_{RR,loss}$ rolling resistance power loss
$q_1$ parameter obtained through tire measurement
$q_2$ parameter obtained through tire measurement
$q_3$ parameter obtained through tire measurement
$q_4$ parameter obtained through tire measurement
R radius
$r_0$ parameter obtained through tire measurement
$r_{ei}$ effective radius of the wheel i
RT reference trajectory
S11 method step
S12 method step
S13 method step
S14 method step
S15 method step
S21 method step
S22 method step
T propulsion torque
$T_{mi}$ torque transmitted by wheel i.
TP target point
V vehicle
$v_{ref}$ parameter obtained through tire measurement
$v_{xi}$ longitudinal velocity of the wheel i
$v_{xwi}$ velocity of the center of the wheel i along the x direction
$v_{yi}$ lateral velocity of the wheel i
x longitudinal direction
y lateral direction
$\alpha_i$ tire slip angle of the wheel i
$\beta$ look ahead angle
$\delta$ steering angle
$\delta_i$ steering angle of wheel i
$\psi$ yaw angle
$\omega_i$ rotational velocity of the wheel i

The invention claimed is:

1. A method, comprising:
determining, by a system of a vehicle comprising a processor, using at least one sensor of the vehicle, at least one vehicle current state parameter associated with a current state of the vehicle while driving, wherein the at least one vehicle current state parameter comprises a current position of the vehicle and a current side-slip angle of the vehicle;
receiving, by the system, a destination parameter describing a destination to be reached by the vehicle;
receiving, by the system, at least one route parameter describing a route starting at the current position of the vehicle and ending at the destination;
determining, by the system, a reference trajectory within one or more lanes along the route that minimizes an estimated power loss of the vehicle when traveling from the current position to the destination based on at least one vehicle estimated state parameter associated with estimated states of the vehicle along the route, the destination parameter and a traveling time, wherein the at least one vehicle estimated state parameter comprises at least one estimated side-slip angle of the vehicle; and controlling, by the system, the driving of the vehicle along the reference trajectory.

2. The method of claim 1, wherein the at least one vehicle current state parameter further comprises at least one of a current longitudinal position of the vehicle, a current lateral position of the vehicle, a current yaw angle ($\psi$) of the vehicle, a current longitudinal speed of the vehicle, or a current yaw rate of the vehicle; and wherein the at least one vehicle estimated state parameter further comprises at least one of an estimated longitudinal position of the vehicle, an estimated lateral position of the vehicle, an estimated yaw angle of the vehicle, an estimated longitudinal speed of the vehicle, or an estimated yaw rate of the vehicle.

3. The method of claim 1, wherein the reference trajectory is described by at least one of a reference longitudinal position, a reference lateral position, a reference yaw angle, a reference longitudinal speed, or a reference travelling time.

4. The method of claim 1, wherein the power loss comprises at least one of a propulsion loss, a transmission loss, a tire loss, or a drag loss.

5. The method of claim 1, further comprising estimating the power loss using a predefined power loss function.

6. The method of claim 1, further comprising:
integrating, by the system, the power loss over time to calculate an energy loss.

7. The method of claim 1, wherein determining the reference trajectory comprises:
respecting at least one boundary condition comprising at least one of a drivable area, a desired speed, a minimum lateral margin, a maximum allowable side slip angle, a maximum available torque, or a road friction coefficient.

8. A method, comprising:
generating, by a system of a vehicle comprising a processor, a reference trajectory, wherein the generating comprises:
receiving at least one vehicle current state parameter associated with a current state of the vehicle while driving, wherein the at least one vehicle current state parameter comprises a current position of the vehicle and a current side-slip angle of the vehicle,
receiving a destination parameter describing a destination to be reached by the vehicle,
receiving at least one route parameter describing a route starting at the current position of the vehicle and ending at the destination,
estimating a power loss of the vehicle when traveling from the current position to the destination based on at least one vehicle estimated state parameter associated with estimated states of the vehicle along the route, the destination parameter and a traveling time, wherein the at least one vehicle estimated state parameter comprises at least one estimated side-slip angle of the vehicle, and
determining the reference trajectory within one or more lanes along the route that minimizes the estimated power loss and leads to the destination, and
controlling, by the system, the driving of the vehicle along the reference trajectory.

9. The method according to claim 8, wherein the controlling comprises controlling a steering angle of the vehicle.

10. The method according to claim 9, further comprising:
performing a pure pursuit control technique for controlling the steering angle.

11. A system of a vehicle, comprising:
a processor; and
a memory, coupled to the processor, that stores executable instructions that, when executed by the processor, facilitate performance of operations, comprising:
determining, using at least one sensor of the vehicle, at least one vehicle current state parameter associated with a current state of the vehicle while driving, wherein the at least one vehicle current state parameter comprises a current position of the vehicle and a current side-slip angle of the vehicle;
receiving a destination parameter describing a destination to be reached by the vehicle;
receiving at least one route parameter describing a route starting at the current position of the vehicle and ending at the destination;
determining a reference trajectory within one or more lanes along the route that minimizes an estimated power loss of the vehicle when traveling from the current position to the destination based on at least one vehicle estimated state parameter associated with estimated states of the vehicle along the route, the destination parameter and a traveling time, wherein the at least one vehicle estimated state parameter comprises at least one estimated side-slip angle of the vehicle; and
controlling the driving of the vehicle along the reference trajectory.

12. The system of claim 11, wherein the at least one vehicle current state parameter further comprises at least one of a current longitudinal position of the vehicle, a current lateral position of the vehicle, a current yaw angle of the vehicle, a current longitudinal speed of the vehicle, current yaw rate of the vehicle; and wherein the at least one vehicle estimated state parameter further comprises at least one of an estimated longitudinal position of the vehicle, an estimated lateral position of the vehicle, an estimated yaw angle of the vehicle, an estimated longitudinal speed of the vehicle, or an estimated yaw rate of the vehicle.

13. The system of claim 11, wherein the reference trajectory is described by at least one of a reference longitudinal position, a reference lateral position, a reference yaw angle, a reference longitudinal speed, or a reference travelling time.

14. The system of claim 11, wherein the power loss comprises at least one of a propulsion loss, a transmission loss, a tire loss, or a drag loss.

15. The system of claim 11, wherein the operations further comprise:
estimating the power loss using a predefined power loss function.

16. A system of a vehicle, comprising:
a processor; and
a memory, coupled to the processor, that stores executable instructions that, when executed by the processor, facilitate performance of operations, comprising:
generating a reference trajectory, wherein the generating comprises:
receiving at least one vehicle current state parameter associated with a current state of the vehicle while driving, wherein the at least one vehicle current state parameter comprises a current position of the vehicle and a current side-slip angle of the vehicle, receiving a destination parameter describing a destination to be reached by the vehicle, receiving at least one route parameter describing a route starting at the current position of the vehicle and ending at the destination, estimating a power loss of the vehicle when traveling from the current position to the destination based on at least one vehicle estimated state parameter associated with estimated states of the vehicle along the route, the destination parameter and a traveling time, wherein the at least one vehicle estimated state parameter comprises at least one estimated side-slip angle of the vehicle, and determining the reference trajectory within one or more lanes along the route that minimizes the estimated power loss and leads to the destination, and controlling the driving of the vehicle along the reference trajectory.

17. A vehicle, comprising:

a processor; and a memory, coupled to the processor, that stores executable instructions that, when executed by the processor, facilitate performance of operations, comprising:

determining, using at least one sensor of the vehicle, at least one vehicle current state parameter associated with a current state of the vehicle while driving, wherein the at least one vehicle current state parameter comprises a current position of the vehicle and a current side-slip angle of the vehicle;

receiving a destination parameter describing a destination to be reached by the vehicle;

receiving at least one route parameter describing a route starting at the current position of the vehicle and ending at the destination;

determining a reference trajectory within one or more lanes along the route that minimizes an estimated power loss of the vehicle when traveling from the current position to the destination based on at least one vehicle estimated state parameter associated with estimated states of the vehicle along the route, the destination parameter and a traveling time, wherein the at least one vehicle estimated state parameter comprises at least one estimated side-slip angle of the vehicle; and controlling the driving of the vehicle along the reference trajectory.

18. A vehicle comprising:

a processor; and a memory, coupled to the processor, that stores executable instructions that, when executed by the processor, facilitate performance of operations, comprising:

generating a reference trajectory, wherein the generating comprises:

receiving at least one vehicle current state parameter associated with a current state of the vehicle while driving, wherein the at least one vehicle current state parameter comprises a current position of the vehicle and a current side-slip angle of the vehicle, receiving a destination parameter describing a destination to be reached by the vehicle, receiving at least one route parameter describing a route starting at the current position of the vehicle and ending at the destination, estimating a power loss of the vehicle when traveling from the current position to the destination based on at least one vehicle estimated state parameter associated with estimated states of the vehicle along the route, the destination parameter and a traveling time, wherein the at least one vehicle estimated state parameter comprises at least one estimated side-slip angle of the vehicle, and determining the reference trajectory within one or more lanes along the route that minimizes the estimated power loss and leads to the destination, and controlling the driving of the vehicle along the reference trajectory.

19. A non-transitory computer-readable medium comprising instructions which, when executed by a processor of a vehicle, cause the processor to perform operations comprising:

determining, using at least one sensor of the vehicle, at least one vehicle current state parameter associated with a current state of the vehicle while driving, wherein the at least one vehicle current state parameter comprises a current position of the vehicle and a current side-slip angle of the vehicle;

receiving a destination parameter describing a destination to be reached by the vehicle;

receiving at least one route parameter describing a route starting at the current position of the vehicle and ending at the destination;

determining a reference trajectory within one or more lanes along the route that minimizes an estimated power loss of the vehicle when traveling from the current position to the destination based on at least one vehicle estimated state parameter associated with estimated states of the vehicle along the route, the destination parameter and a traveling time, wherein the at least one vehicle estimated state parameter comprises at least one estimated side-slip angle of the vehicle; and controlling the driving of the vehicle along the reference trajectory.

20. A non-transitory computer-readable medium comprising instructions which, when executed by a processor of a vehicle, cause the processor to perform operations comprising:

generating a reference trajectory, wherein the generating comprises:

receiving at least one vehicle current state parameter associated with a current state of the vehicle while driving, wherein the at least one vehicle current state parameter comprises a current position of the vehicle and a current side-slip angle of the vehicle, receiving a destination parameter describing a destination to be reached by the vehicle, receiving at least one route parameter describing a route starting at the current position of the vehicle and ending at the destination, estimating a power loss of the vehicle when traveling from the current position to the destination based on at least one vehicle estimated state parameter associated with estimated states of the vehicle along the route, the destination parameter and a traveling time, wherein the at least one vehicle estimated state parameter comprises at least one estimated side-slip angle of the vehicle, and determining the reference trajectory within one or more lanes along the route that minimizes the estimated power loss and leads to the destination, and controlling the driving of the vehicle along the reference trajectory.

* * * * *